Patented May 1, 1951

2,550,996

UNITED STATES PATENT OFFICE 2,550,996

PROCESS FOR THE ISOLATION OF POLYVINYL CHLORIDE

Paul Halbig, Fribourg, Switzerland

No Drawing. Application February 27, 1948, Serial No. 11,834. In Switzerland March 9, 1943

Section 1, Public Law 690, August 8, 1946
Patent expires March 9, 1963

5 Claims. (Cl. 260—92.8)

This invention relates to improvements in a process for the separation of polyvinyl chloride from emulsions containing the same.

It is well known in the art to polymerise vinyl chloride in the presence of water, emulsifying agents and catalysts, so as to obtain an aqueous emulsion of polyvinyl chloride. The resulting emulsion is, if not being used as such, further treated to obtain the solid polymer. To such end the emulsion may be broken down, i. e. coagulated, e. g. by adding electrolytes, whereby the polymer is precipitated, and the powder obtained separated from the liquid phase, washed and dried, or the emulsion may be dehydrated, e. g. in a spray dryer, so as to obtain a dry product in a single step. If the process is performed according to the method of direct dehydration or drying, the solid polymer will contain all the foreign substances which were present in the emulsion and more particularly the emulsifying agent and the catalyst. If the separation is performed by coagulation, the polymer will precipitate in most cases in form of fine particles which may be filtered and washed out only with difficulty, and which will retain large amounts of water and residual electrolytes. In both cases large amounts of water must be evaporated in order to obtain the polymers in dry state.

It now has been found that the coagulated polymers may be easily converted into a readily filtrable, washable and water-repellent form, when the coagulated emulsion is treated with an organic liquid which is insoluble or substantially insoluble in water. This treatment is best performed by intensively stirring the emulsion admixed with the organic liquid. The organic liquid should have substantially no dissolving effect on polyvinyl chloride at the temperatures prevailing during the treatment, and should be easily removable from the mixture. Substances which are particularly adapted for such purpose are ether, chloroform, benzene and the like. A substance of special usefulness is the liquid monomeric vinyl chloride. By choosing certain amounts of the organic liquid and by controlling the time and temperature of the treatment, the water-repellent properties of the polymer may be enhanced to such a degree, that products are obtained which, after a simple centrifugal separation, do not contain more than about 10% of water.

The present invention will now be described in full detail by the following example, without being limited thereto. The parts are by weight.

Example 1000 parts of a polyvinyl chloride-emulsion as prepared, e. g. according to the process of the copending Swiss Patent 239,764, and containing about 25% of polyvinyl chloride are coagulated by addition of 10 gr. of magnesium sulfate. The fairly thick slurry is then stirred during about 10 minutes in the presence of 100 parts of vinyl chloride, at a temperature of about 30° C. and in a pressure vessel. The vinyl chloride then is blown off at a temperature of about 15° C. The polymer now has the form of a heavy, gritty, water-repellent powder, which can easily be separated from the liquid phase, centrifuged and washed until it is free from any remaining electrolyte. In this manner there will easily be obtained a product having a water content of only 20% and which after drying yields a pure powdery polymer. When the treatment is performed at somewhat higher temperatures, e. g. at about 50° C., the polymer forms bead-like aggregations which, after centrifugation, contain only about 5% of water. After drying, these aggregations may easily be crushed to a fine powder, e. g. by finger.

Generally, the organic liquids, which are insoluble or substantially insoluble in water, are added to the emulsion, as described above, after the latter has undergone coagulation, i. e. immediately before the treatment. It may also be advisable, however, especially when the substances are to remain in the polymer, to add these substances before the emulsion is coagulated, in which case the actual treatment, i. e. the intensive agitation or stirring of the liquid mixture, also is performed after the coagulation of the emulsion. When the treating liquid is for instance monomeric vinyl chloride, it may be derived from the polymerisation process itself by interrupting the reaction as long as there is a sufficient amount of monomeric vinyl chloride present in the mixture. Such interruption may be effected by cooling the mixture. The emulsion containing monomeric vinyl chloride, is then coagulated by adding suitable substances or by other means, e. g. by cooling or treatment with supersonic vibrations, and then stirred for some time, whereupon the monomeric vinyl chloride is blown off, and the polymer further treated as described above. It may be advisable to filter the polymer under pressure of vinyl chloride.

It is essential that the coagulated polymer is subjected to a thorough treatment with the organic liquid, so that the particles of the polymer attain the desired water-repellent character.

What I claim is:

1. A process for the isolation of polyvinyl chloride from a coagulated aqueous emulsion thereof, comprising the steps of intensively stirring the coagulated aqueous emulsion with a liquid essentially water-insoluble organic compound which has substantially no dissolving effect on polyvinyl chloride at the temperatures prevailing during the stirring, continuing the said stirring until the polymer has acquired a degree of water-repellency such that, after simple centrifuging, its water content does not exceed more than about 20%, then removing the organic liquid from the stirred coagulated emulsion, and finally isolating the polymer from the remaining aqueous mixture.

2. A process according to claim 1, wherein the organic compound is monomeric liquid vinyl chloride.

3. A process according to claim 2, wherein the coagulated aqueous emulsion contains about 25% of polyvinyl chloride and the monomeric liquid vinyl chloride in the mixture being stirred is present in a proportion of about 100 parts per 1000 parts of emulsion.

4. A process according to claim 3, wherein the stirring is continued for a period of about 10 minutes at a temperature of about 30–50° C.

5. A process according to claim 1, wherein the organic liquid is residual monomeric liquid vinyl chloride derived from the original polymerization emulsion by interrupting the polymerization prior to completion thereof.

PAUL HALBIG.

REFERENCES CITED

The following references are of record in the file of this patent:

UNITED STATES PATENTS

| Number | Name | Date |
|---|---|---|
| 2,068,424 | Mark | Jan. 19, 1937 |
| 2,458,636 | Plambeck | Jan. 11, 1949 |